G. H. KOESTER.
LIQUID DISPENSING APPARATUS.
APPLICATION FILED OCT. 11, 1916.
1,233,794.
Patented July 17, 1917.
4 SHEETS—SHEET 2.
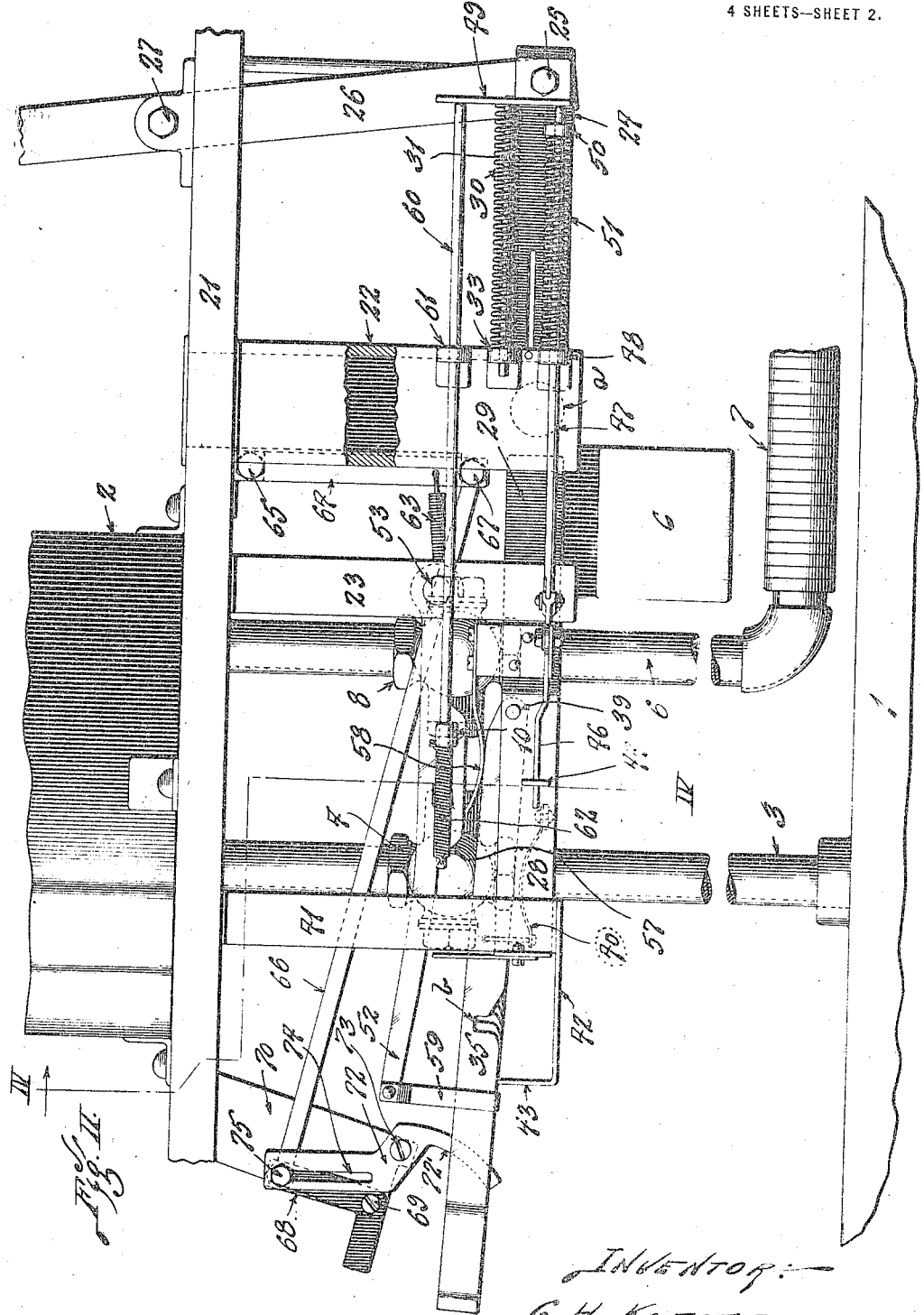

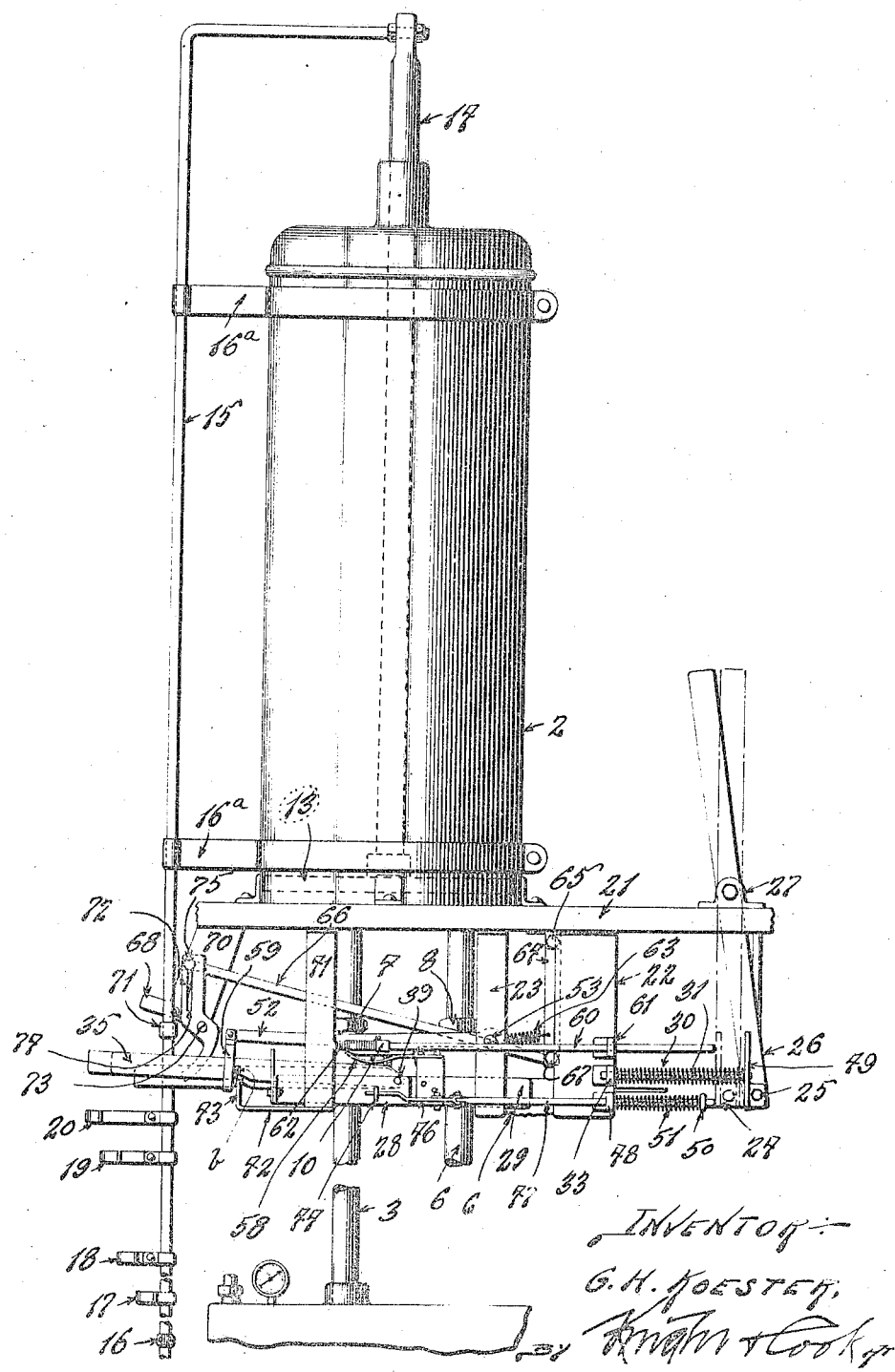

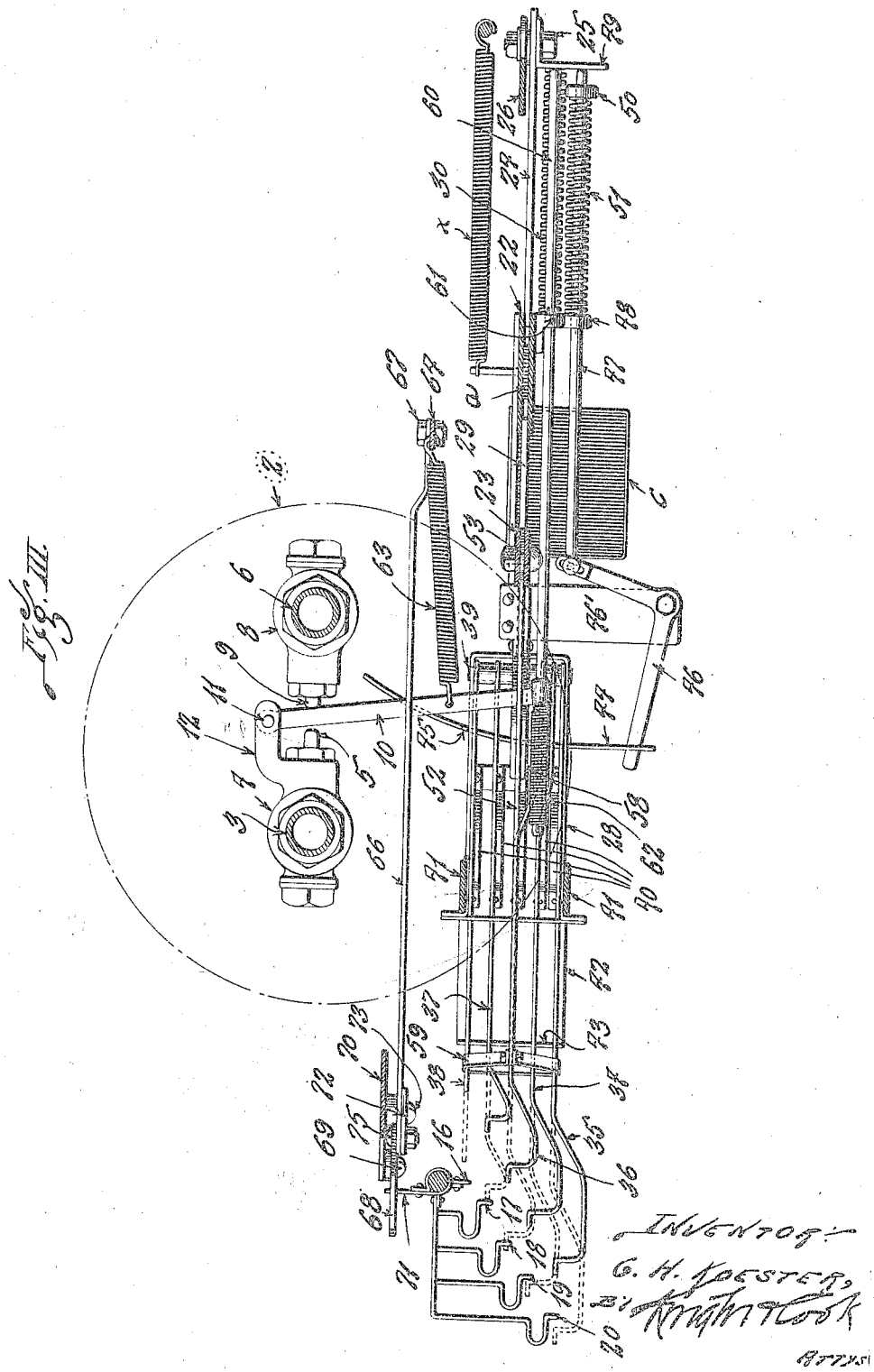

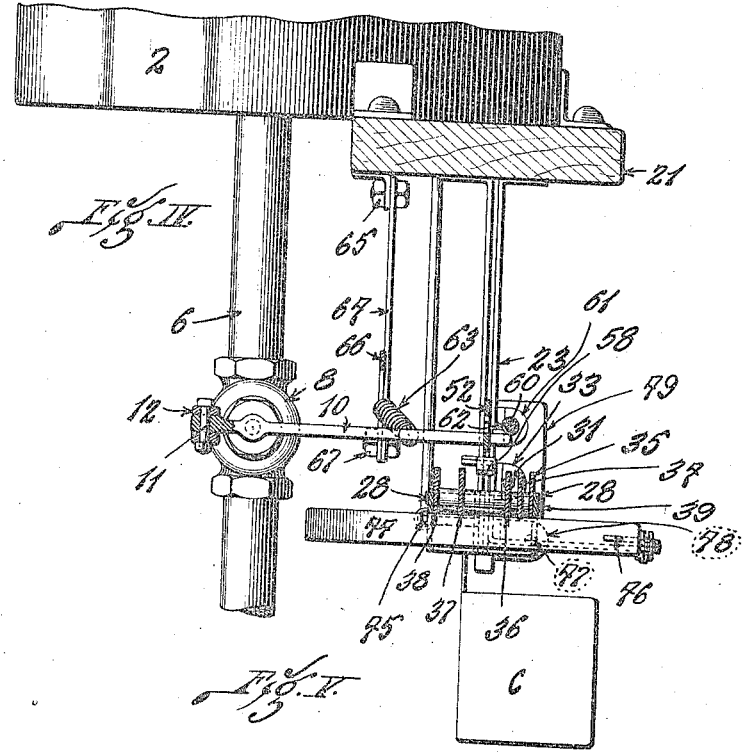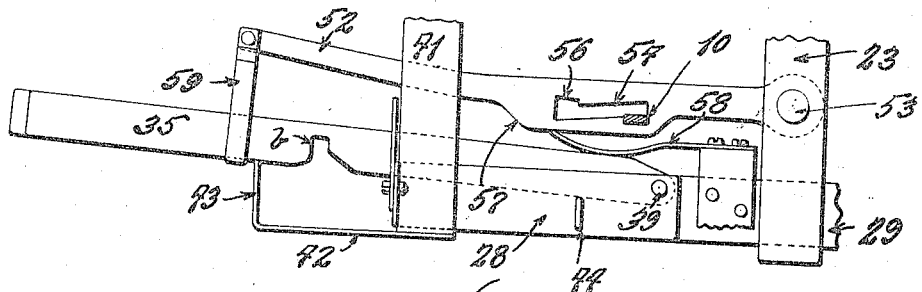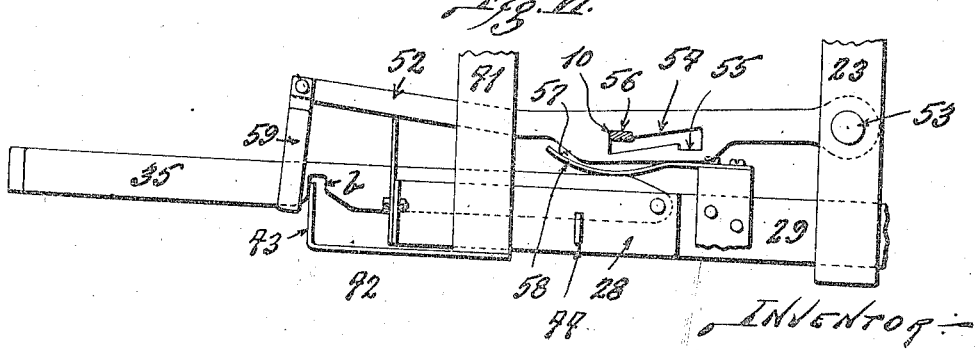

UNITED STATES PATENT OFFICE.

GEORGE H. KOESTER, OF CROCKER, MISSOURI, ASSIGNOR OF ONE-FIFTH TO GEORGE W. ORRICK, OF CROCKER, MISSOURI.

LIQUID-DISPENSING APPARATUS.

1,233,794.   Specification of Letters Patent.   Patented July 17, 1917.

Application filed October 11, 1916. Serial No. 124,946.

*To all whom it may concern:*

Be it known that I, GEORGE H. KOESTER, a citizen of the United States of America, a resident of Crocker, in the county of Pulaski, State of Missouri, have invented certain new and useful Improvements in Liquid-Dispensing Apparatus, of which the following is a full, clear, and exact description, reference being had to the accompanying drawings, forming a part of this specification.

My invention relates to an apparatus for dispensing gasolene or other commodities, one of the main objects being to provide an apparatus of this kind including coin controlled mechanism which is rendered operable through the medium of coins of various denominations, thereby avoiding the necessity of the operator being provided with a coin of one particular denomination to supply his needs from the apparatus.

Figure I is a side elevation of my apparatus.

Fig. II is an enlarged side elevation of the mechanism for controlling and operating the valves for the apparatus.

Fig. III is a top or plan view of the mechanism shown in Fig. II, the parts immediately above said mechanism being shown in horizontal section.

Fig. IV is a vertical section taken on line IV—IV, Fig. II.

Figs. V and VI are diagrams illustrating different positions of the valve locking elements.

In the accompanying drawings, 1 designates a main supply tank in which the liquid to be dispensed is stored, and 2 is a measuring tank.

3 designates an intake pipe through which the contents of the supply tank may pass to the measuring tank. The supply tank is preferably located at a lower level than the measuring tank, and its contents are forced therefrom through the pipe 3 by pressure, although, if desired, the position of the parts might be reversed and the desired flow obtained by gravity. In the pipe 3 is an intake valve 4 having a slidable stem 5.

6 designates a delivery pipe leading from the measuring tank and through which the amount of liquid measured in said tank may be delivered to the customer, this outlet pipe preferably having connected thereto a hose 7 which may be readily moved to the vessel into which the contents of the measuring tank are to be emptied. The outlet pipe 6 contains a discharge valve 8 having a slidable stem 9, said valve and its stem being preferably arranged in approximately the same plane as the intake valve 4 and its stem, thereby providing for the operation of the valve stems of both valves by a single valve lever 10 located between them, as seen in Fig. III. The valve lever 10 is pivotally connected at 11 to a bracket arm 12 supported by one of the valves, and when it is moved horizontally in one direction, it serves to open the valve 4, whereas when it is moved horizontally in the other direction it serves to open the valve 8.

In the measuring tank 2 is a piston 13, (see dotted lines Fig. I) which is snugly fitted to the inner wall of the tank and is adapted to move vertically therein. This piston is carried by a piston rod 14 which extends through the upper end of the measuring tank and has attached to it a trip rod 15 operable in suitable guides 16ª secured to the measuring tank.

The piston 13 is adapted to be lifted by the liquid entering the measuring tank from the intake pipe 3, and it continues to rise therein as long as the valve 4 in said pipe is open, this valve remaining open until a certain quantity of liquid has been admitted to the measuring tank, determined by valve controlling mechanism which is in part under the influence of a number of elements carried by the trip rod 15 adapted to come into action when the piston is more or less elevated and there is more or less admission of contents into the measuring tank beneath said piston. The trip rod 15 has fixed to it a series of trips 16, 17, 18, 19 and 20, for example, corresponding respectively to the coins one dollar, fifty cents, twenty-five cents, ten cents, and five cents. These trips are spaced apart on the trip rod, the trip corresponding to the lowest denomination coin being uppermost and nearest the element it is to actuate, the trip corresponding to the coin of highest denomination being lowermost and farthest from the element it is to actuate, while those corresponding to coins of intermediate denomination are located between the other two, as seen in Fig. I.

The measuring tank 2 of my apparatus is preferably mounted upon a platform or other support 21, and the operating mechanism about to be described is located beneath this platform and preferably supported thereby. 22 designates a coin chute shown secured to the platform 21, and 23 is a hanger also secured to said platform. The coin chute 22 has a vertical channel of sufficient size to receive coins of all denominations from a five cent coin to a silver dollar, and at the lower end of said chute are horizontal vertical slots which receive parts about to be described between which a coin may be engaged while it is lying at the bottom of the chute, as seen in dotted line at $a$ Fig. II.

24 designates a follower operable in the coin chute to engage the coin therein, said follower being pivoted at 25 to a hand lever 26 which is in turn pivoted at 27 to a pivot member mounted on the platform 21.

28 designates a latch dog carrier arranged in front of the follower 24 and having a rear arm 29 which is normally slidably arranged in the coin chute 22 opposite the forward end of the follower 24, but separated therefrom to permit of any coin deposited in the chute becoming seated between the opposing ends of said parts 24 and 29. A coin so seated serves as a transmitting element between the follower 24 and the carrier arm 29, so that when said follower is actuated by the hand lever 26 it will, through the medium of the coin, be permitted to transmit motion in a corresponding direction to the carrier 28 for the purpose to be hereinafter set forth. The follower 24 and the hand lever 26 are normally maintained in retracted positions to provide the coin spaces mentioned due to the interpositioning of a retracting spring 30 between said hand lever and the coin chute 22, said spring being arranged upon a rod 31 secured to an arm 49 carried by the follower 24 and slidably mounted in a bracket 33 secured to the coin chute.

The latch dog carrier 28 is normally held retracted by a spring $x$ and comprises, aside from the arm 29, a pair of spaced arms between which are positioned a series of latch dogs 34, 35, 36, 37 and 38, corresponding respectively to the denominational coins five cents, ten cents, twenty-five cents, fifty cents and one dollar. Said several latch dogs have their rear ends loosely fitted, independently of each other, to a pivot rod 39 mounted in and extending transversely of the carrier 28, and their rear ends extend beyond the rear end of said carrier. In each latch dog at a point back of the carrier 28 is a notch $b$ which extends upwardly from the lower edge of the dog, as seen most clearly in Fig. II. Each latch dog has connected to it a spring 40 which normally tends to move the latch dog in a downward direction but is permitted to perform this function only at a time to be hereinafter specified.

The latch dog carrier 28 is supported and guided in a hanger 41 preferably of U-shape so that it extends beneath the carrier, and said hanger has secured to it a catch plate 42 provided with an upturned end 43 adapted to enter the notch $b$ in any of the latch dogs 34, 35, etc., when the carrier 28 is moved forwardly to a sufficient degree to bring the notch of a latch plate in a position over the upturned portion of the catch plate.

It is necessary in the operation of my dispensing apparatus that only the proper latch dog 34, 35, etc., be permitted to become engaged with the catch plate 42, and to provide for the engagement of only the proper dog with said plate, I use the following mechanism: 44 designates a detent bar which is operable transversely in in the latch dog carrier 28 beneath the series of latch dogs, said detent bar being provided with a single notch 45 extending downwardly from its upper edge (see Fig. IV) adapted to receive any of the latch dogs when the notch is beneath said dog. The detent bar 44 is shifted transversely in the latch dog carrier 28 by a bell crank lever 46. One arm of said lever is loosely seated in the detent bar and the other arm is pivotally connected to an operating rod 47 slidably mounted in a bracket 48 on the coin chute 22. The operating rod 47 extends rearwardly from the bell crank lever 46 into proximity with the point of pivotal connection between the hand lever 26 and the follower 24, and the forward end of said rod is adapted to be engaged by an arm 49 secured to said follower. Upon the rod 47 nearest its rear end is a collar 50 and between said collar and the bracket 48 is an expansion spring 51 which normally tends to move the rod 47 toward the arm 49 employed to impart a movement to said rod in the reverse direction when the follower 24 is moved forwardly. It should be here noted that the notch 45 in the detent bar 44 is normally located at the side of the latch dog carrier 28 farthest from the bell crank lever 46 and beyond the latch dog at that side of the carrier.

I will next describe the mechanism controlling the operation of the intake valve 4 through which the liquid to be dispensed enters the measuring tank 2. This mechanism includes a locking bar 52 located above the latch dog carrier 28, said bar having its rear end pivoted at 53 to the hanger 23. Said locking bar is provided with a longitudinal slot 54 at the rear end and bottom of which is a notch 55 and at the top and forward end of the same slot is a notch 56. The valve operating lever 10 extends through said slot and occupies the notch 55 when the valve 4 is open and the notch 56 when the valve 8 is open, it being understood that when either valve is open the other is closed. At the bottom of the locking bar 52 is a cam 57 which is engaged by a supporting arm 58 when the latch dog carrier 28 is in its rear position, at which time the valve 4 is closed. The arm 58 is attached to the carrier 28 and moved forwardly with said carrier to a sufficient degree to allow downward movement of the locking bar 52 and permit the escape of the valve operating lever 10 from the notch 55 in said locking bar. The locking bar 52 has secured to it at its forward end a loop 59 which extends beneath the entire series of latch dogs 34, 35, etc., and serves to release the valve operating lever 10, as will hereinafter more fully appear.

The means for operating the valve operating lever 10 in a forward direction comprises a push rod 60 mounted in a bracket 61 on the coin chute 22 and slidably arranged in the lever 10. The rear end of said rod 60 opposes the arm 49 carried by the follower 24, thereby providing for a forward movement of said rod upon the operation of the hand lever 26 and said follower. A normally inactive spring 62 surrounding the rod 60 is secured to the forward end of said rod and to the valve operating lever 10. When the rod 60 is moved forwardly under the influence of the arm 49 said spring 62 is expanded to render it active in order that it will perform the function of moving the valve operating lever forwardly in the slot in the locking bar 52 to open the intake valve 4.

The mechanism for shifting the valve operating lever 10 rearwardly so that it will open the discharge valve 8 includes a normally inactive spring 63 attached at one end to said lever and having its other end attached to a pull 64 suspended from a pivot member 65. 66 is a push rod having its rear end pivoted at 67 to the pull arm 64. The forward end of said push rod is pivoted to one arm of an L-shaped lever 68 pivoted at 69 to a bracket 70 depending from the platform 21, adjacent to the path of movement of the trip rod 15. The second arm of the lever 68 is normally in a position to be struck by a trip 71 carried by the trip rod 15 in order that said lever may be thrown rearwardly when said trip rod is elevated under the influence of the piston in the measuring tank 2. When said lever is thus thrown the push rod 66 is operated and in turn acts to operate the pull arm 64 with the result of expanding the spring 63, so that it will serve to shift the valve operating lever 10 when it is to be moved to open the discharge valve 8. 72 is a two armed restoring lever pivoted at 73 to the bracket 70. In one arm of this lever is a longitudinal slot 74 which receives the pivot pin 75 connecting the push rod 66 and the lever 68. The other arm 72′ of said lever is adapted to be engaged by the trip 71 on the trip rod 15 when said trip rod descends after moving upwardly, whereby said lever 72 is caused to perform the office of returning the lever 68 to its normal position ready for the next operation of storing power in the spring 63.

In the practical use of my dispensing apparatus the operation is as follows:—When the measuring tank is empty the carrier 28 and the parts for operating it are in the positions shown in full lines in the drawings aside from Figs. I and VI. The valve operating lever 10 is at this time in the position seen most clearly in Figs. III and V.

To provide for the operation of the machine, a coin is dropped into the chute 22 and occupies the space between the follower 24 and the push arm 29 of the latch dog carrier 28. The hand lever 26 is now grasped by the operator and pulled rearwardly with the result of causing the coin to become impinged between the parts 24 and 29. This initial movement results in the operation of the detent bar 44 to position the notch 45 therein beneath the particular latch dog corresponding to the coin which has been deposited. For example, if a silver dollar is deposited in the coin chute only a slight movement of the follower 24 will be occasioned before the coin is gripped between the follower and carrier push arm, and the detent bar 44 will be moved only slightly, this movement being, however, sufficient to carry the notch in said bar beneath the "dollar" latch dog 38, so that it will thereafter descend into the notch as desired. If a smaller coin, for instance a quarter, is deposited in the coin chute, the proportionate movement to provide for the gripping of this coin will be greater than for the larger coin, and as a result a greater movement will be imparted to the bell crank lever 46 and to the detent bar 44, and this movement will be proper to position the notch and the detent bar beneath the "quarter" or "twenty-five cents" latch bar 36. Inasmuch as the bell crank lever 46, through the medium of which the detent bar 44 is operated, is supported by an arm 46′ movable with the latch dog carrier 28, and the arm 49 for operating the rod 47 is movable with the follower 24, said detent bar will remain in the position to which it has been adjusted while the latch dog carrier is being moved forwardly after the adjustment of the detent bar.

Continued forward movement of the follower 24 results in causing the latch dog carrier 28 to be moved forwardly until the notch *b* in the latch bar over the notch in the detent bar 44 has reached the upturned end 43 of the catch plate 42. The spring 40 connected to said latch bar will then pull it downwardly so that the catch plate will enter the notch and the particular latch dog will be held from rearward movement, as well as the latch dog carrier and the remaining latch bars. The positions of the latch dog and its carrier at this time are illustrated in Fig. I. When the parts are adjusted as just described, the coin utilized to provide for the operation of the parts is moved through the slot previously occupied by the push arm 29, and upon the release of the hand lever 26, said coin falls into the coin box c.

During the forward movement of the follower 24, the arm 49 associated therewith acts to press the push rod 60 forwardly and the spring 62 is expanded to store power therein. Simultaneously the arm 58 moves forwardly with the latch dog carrier 28 until it has passed the cam 57 of the locking bar 52, and when this has happened the locking bar is moved downwardly under the influence of the spring 40 which acts to lower the latch dog 34, 35, etc., which is to be engaged with the latch plate 42. Naturally the downward movement of the locking bar 52 must occur before the engagement of the latch bar with said catch plate.

The downward movement of the locking bar 52 results in the valve operating lever 10 being unseated from the notch 55 in said bar, and the valve operating lever 10 is then shifted by the spring 62 to the opposite end of the slot 54 to become seated in the notch 56. Such movement of the valve operating lever results in pressure against the valve stem 5 and the consequent opening of the intake valve 4. Communication is thus established between the supply tank and the measuring tank and such communication is maintained until the piston 13 in the measuring tank has been elevated to a degree to measure the desired quantity of liquid, just previous to which time the proper trip 16, 17, etc., on the trip rod 15 strikes the lowered latch dog 34, 35, etc., and elevates it so that the latch dog carrier and the parts associated with it may move rearwardly to their normal positions, a movement that is occasioned by the retracting spring x. During the backward movement of the carrier the arm 58 rides against the cam 57 on the locking bar 52 and acts to elevate said bar, whereby the valve operating lever 10 is unseated from the notch 56, thereby permitting rearward movement of said valve operating lever 10 to its normal position under the influence of the spring 63 and parts conjoined thereto, including the L-shaped lever 68. As a result of the movements of the parts at this time, the valve operating lever 10 is caused to press against the stem 9 of the discharge valve 8, thereby opening said valve and permitting the contents of the measuring tank to flow through the discharge pipe 6.

It should be noted, in conclusion, that the notches b in the latch bars 34, 35, etc., are offset from each other and that consequently said latch bars will extend to different distances beyond the catch plate 42, so that they may be engaged by the proper trips 16, 17 etc., on the trip rod 15 without any other trip on said rod engaging a latch dog while the trip rod is moving upwardly.

I claim:—

1. A liquid dispensing apparatus comprising a reservoir, a piston for measuring the amount of liquid admitted to said reservoir, inlet and outlet pipes having adjacent valves, a valve operating lever common to both valves, and coin controlled means for operating said valve operating lever, said coin controlled means including selective elements for limiting the movement of the piston according to the size of the coin deposited.

2. In a liquid dispensing apparatus, a measuring reservoir having an outlet, a discharge valve controlling said outlet, valve operating means, and coin controlled means for controlling said valve operating means, said coin controlled means comprising a measuring device operable through the medium of the contents of said reservoir, trip members movable with said measuring device, a locking member adapted to be engaged by a part of said valve operating means to hold said means temporarily from movement, a latch dog carrier, carrier operating means between which and said carrier coins of different sizes may be interposed to transmit movement to said carrier, a series of latch dogs movable with said latch dog carrier, an abutment with which said latch dogs are adapted to engage selectively to hold them in positions to be tripped by said trip members, and means coöperable with said carrier for operating said locking member to release said valve operating means.

3. In a liquid dispensing apparatus, a measuring reservoir having an outlet, a discharge valve controlling said outlet, valve operating means, and coin controlled means for controlling the movements of said valve operating means, said coin controlled means comprising a measuring device operable through the medium of the contents of said reservoir, trip members movable with said measuring device, a locking member controlling the operation of said valve operating means, a latch dog carrier, means for causing different sized coins to operate said latch dog carrier, a series of latch dogs movable with said carrier, an abutment with which said latch dogs are adapted to engage to hold them selectively in positions to be tripped by selective trip members associated with said measuring device, and means coöperable with said carrier for releasing said valve operating means from said locking member.

4. In a liquid dispensing apparatus, a measuring reservoir having an outlet, a discharge valve controlling said outlet, discharge valve operating means, and coin controlled means for controlling said valve operating means, said coin controlled means comprising a measuring device operable through the medium of the contents of said reservoir, trip members movable with said measuring device, a restraining member for engagement with said valve operating means to hold said means temporarily from movement, a carrier, a series of trippable members movable with said carrier adapted to be engaged by said trip members, means by which said trippable members may be held selectively in positions to be engaged by said trip members, carrier operating means between which and said carrier coins of different sizes may be interposed to transmit movement of said carrier, and means operable by said carrier adapted to actuate said restraining member to free said valve operating means.

5. In a liquid dispensing apparatus, a measuring reservoir having an outlet, a valve controlling said outlet, valve operating means, and coin controlled means for controlling said valve, said coin controlled means comprising a measuring device operable through the medium of the contents of said reservoir having associated therewith a plurality of trip members, a carrier, a series of trippable members attached to said carrier adapted to be moved toward said trip members by pressure exerted against coins of different sizes, means for exerting pressure against the coins, an abutment with which said trippable members are adapted to engage, and means for restraining said valve operating means, said restraining means being operable by said carrier.

6. In a liquid dispensing apparatus, a measuring reservoir having an outlet, a valve controlling said outlet, valve operating means, and coin controlled means for controlling said valve, said coin controlled means comprising a measuring device operable through the medium of the contents of said reservoir having associated therewith a plurality of trip members, a carrier, a series of trippable members attached to said carrier adapted to be moved toward said trip members by pressure exerted against coins of different sizes, means for exerting pressure against the coins, an abutment with which said trippable members are adapted to engage, means under the control of said coin pressing means for selecting the trippable member to be placed in engagement with said abutment, and means coöperable with said carrier for restraining said valve operating means.

7. In a liquid dispensing apparatus, a measuring reservoir having an outlet, a valve controlling said outlet, valve operating means, and coin controlled means for controlling said valve operating means, said coin controlled means comprising a measuring device operable through the medium of the contents of said reservoir having associated therewith a plurality of trip members, a carrier, a series of trippable members attached to said carrier adapted to be moved toward said trip members by pressure exerted against coins of different sizes, means for exerting pressure against the coins, an abutment with which said trippable members are adapted to engage, and a notched detent bar extending transversely of said trippable members movable by said coin pressing means for selecting the trippable member to be placed in engagement with said abutment.

8. In a liquid dispensing apparatus, a measuring reservoir having an outlet, a valve controlling said outlet, valve operating means, and coin controlled means for controlling said valve operating means, said coin controlled means comprising a measuring device operable through the medium of the contents of said reservoir having associated therewith a plurality of trip members, a carrier, a series of trippable members attached to said carrier adapted to be moved toward said trip members by pressure exerted against coins of different sizes, means for exerting pressure against the coins, an abutment with which said trippable members are adapted to engage, and a notched detent bar extending transversely of said trippable members movable by said coin pressing means for selecting the trippable member to be placed in engagement with said abutment, said valve operating means including a spring, and means operable by said measuring device whereby power is stored in said spring.

9. In a liquid dispensing apparatus, a measuring reservoir, coin controlled means for controlling the delivery of liquid from said reservoir, said coin controlled means including a discharge valve, selective valve controlling members, and a measuring device for actuating said selective valve controlling members to control the delivery of the liquid from said reservoir, said measuring device including a measuring member movable through the medium of the liquid in said reservoir, and a plurality of trip members movable in response to movements of said measuring member, each of said trip members being adapted to actuate a selective valve controlling member.

10. In a liquid dispensing apparatus, a measuring reservoir, an inlet valve for controlling the admission of liquid to said reservoir, an outlet valve for controlling the discharge of liquid from said reservoir, and coin controlled means for controlling the flow of liquid to and from said reservoir, said coin controlled means comprising selective valve holding members adapted to retain the inlet valve in its open position and the outlet valve in its closed position, a measuring device adapted to release said selective valve holding members, said measuring device including trip members arranged in different planes and movable through the medium of the liquid in said reservoir so as to release the selected valve holding member when the liquid reaches a predetermined level, and a spring for opening said outlet valve when the selected valve holding member is released by one of said trip members.

11. In a liquid dispensing apparatus, a measuring reservoir adapted to receive the liquid, inlet and outlet valves for controlling the flow of liquid to and from said reservoir, a valve operating member adapted to open and close said valves, a yieldable retaining bar adapted to retain said valve operating member in its operative positions, coin controlled means including a manually operable spring adapted to move said valve operating member from one position to another so as to close said outlet valve and open said inlet valve, a series of selective latch bars each of which is adapted to retain said retaining bar in one of its operative positions, and a measuring device comprising a plunger movable by the liquid in said reservoir, and a series of trip members arranged in different planes and adapted to coöperate with the selected latch bar to release said retaining bar, thereby releasing said valve operating member, and a spring for restoring said valve operating member to permit said inlet valve to close and open said outlet valve.

12. In a dispensing apparatus, a measuring tank, a piston operable in said tank, a trip rod carried by said piston, a valve controlling entrance of liquid to said tank, and selective coin controlled valve operating members adapted to be rendered inactive by the movement of said trip rod.

13. In a dispensing apparatus, a measuring tank, a piston operable in said tank, a trip rod carried by said piston, a valve controlling entrance of liquid to said tank, and coin controlled valve operating mechanism adapted to be rendered inactive by the movement of said trip rod, said coin controlled mechanism including a plurality of selective elements movable into the path of movement of said trip rod.

14. In a dispensing apparatus, a measuring tank, a piston operable in said tank, a trip rod carried by said piston, a valve controlling entrance of liquid to said tank, and coin controlled valve operating mechanism adapted to be rendered inactive by the movement of said trip rod, said coin controlled mechanism including a plurality of selective elements, and said trip rod being provided with a plurality of elements for engagement with the selective elements of the coin controlled mechanism.

GEORGE H. KOESTER.